Figure 1:
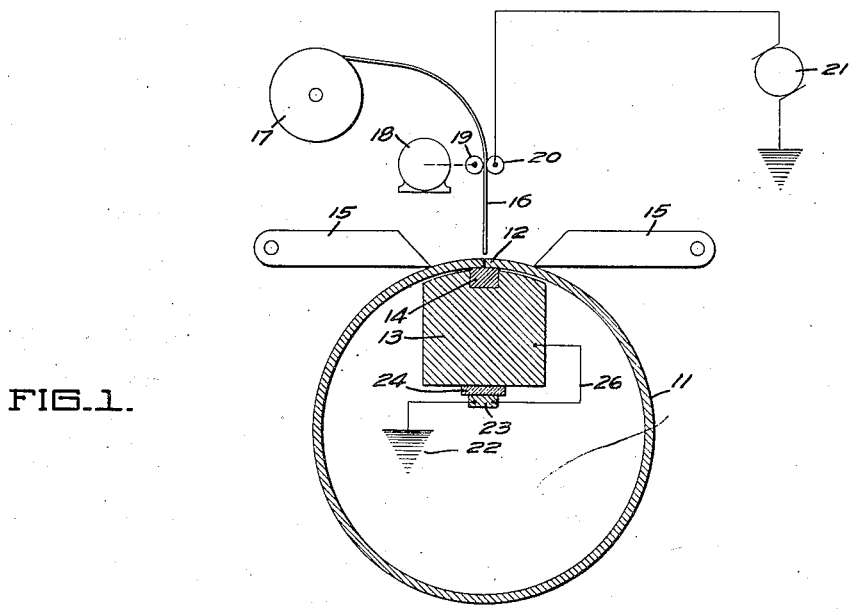

June 24, 1930.          A. K. HARFORD          1,765,373
ARC WELDING SYSTEM
Filed Aug. 5, 1925

INVENTOR
A. K. Harford
BY White Frost Swans
his ATTORNEYS

Patented June 24, 1930

1,765,373

UNITED STATES PATENT OFFICE

ALBERT K. HARFORD, OF OAKLAND, CALIFORNIA, ASSIGNOR, BY MESNE ASSIGNMENTS, TO NEW METAL PRODUCTS COMPANY, OF EMERYVILLE, CALIFORNIA, A CORPORATION OF CALIFORNIA

ARC-WELDING SYSTEM

Application filed August 5, 1925. Serial No. 48,207.

This invention relates to a system for welding metallic objects by the aid of an electric arc.

It is now quite common to unite metal parts by the aid of an electric arc, either alternating or direct current, which serves to fuse, near the point of junction, the arc electrode as well as the parts to be united. A difficulty that has been experienced in this class of work is to keep the arc steady; and it has been proposed to use a variety of appliances and devices for ensuring against the erratic behavior or extinction of the arc.

In the course of my experimentation with arcs, especially direct current arcs, I have discovered one source of such a tendency to instability, and it is accordingly one of the objects of my invention to provide a simple and efficacious way for securing arc stability.

It is of course well known that when a magnetic field acts upon an arc, especially in a transverse direction, the arc is bowed out, and may rupture if the field is sufficiently strong. But under any circumstance, even in a weak field, the arc becomes unsteady and difficult to control. I have discovered that when direct current arcs are used for welding purposes, the large welding current flowing to and from the arc electrodes sets up a magnetic field large enough to influence the arc deleteriously. It is another object of my invention to overcome substantially entirely this source of trouble, and especially by substantially entirely neutralizing this disturbing magnetic field.

The disturbing field is especially noticeable when parts made from magnetic material, such as iron or steel, are being welded, since under such circumstances, the permeability of such material assists in building up the disturbing field. I have noticed this effect very pronouncedly in connection with welding thin material to form cylindrical bodies, such as are adapted for use as range boilers, by applying an electric arc to the abutting edges of the rolled up material. It is thus still another object of my invention to provide a welding system for iron or steel cylinders in which no substantial disturbing magnetic force exists.

My invention possesses other advantageous features, some of which with the foregoing, will be set forth at length in the following description, where I shall outline in full that form of the invention which I have selected for illustration in the drawings accompanying and forming part of the present invention. Although I have shown in the drawings but one form of my invention, I do not desire to be limited thereto, since the invention as defined in the claims may be embodied in other forms also.

Figure 2:
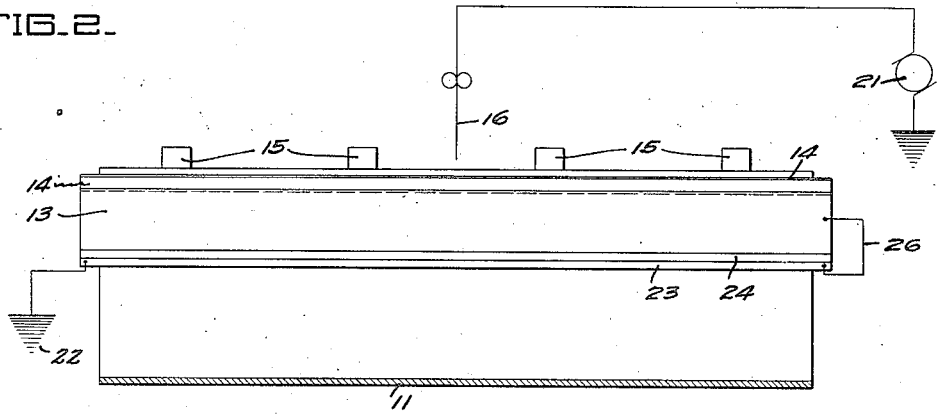

Referring to the drawings:

Figure 1 is a diagrammatic sectional view, illustrating one adaptation of my invention in connection with the manufacture of cylindrical bodies; and Fig. 2 is a diagrammatic longitudinal sectional view of the installation shown in Fig. 1.

In Fig. 1 I illustrate a cylindrical body 11 that is rolled up from flat material to have the opposite edges adjacent, as at 12. This body may be used for example in connection with hot water systems or the like, and to provide a tight vessel, the contiguous edges at 12 are butt welded by the aid of the apparatus now to be described. To support the body 11, a long horn 13 is used, extending longitudinally and appropriately held on stationary standards (not shown). The cylinder 11 is slipped over this horn, in which there may be an inset 14 of steel or other good magnetic material which may be renewed when worn. The edges at 12 are positioned uppermost and rest on the steel inset 14. The cylinder 11, during the process of welding, is usually clamped to the horn 13 by a series of heavy duty clamps 15, which engage the cylinder on each side of the edges 12. These clamps are shown in the present instance as pivoted at one end, and a clamping force applied in any desired fashion, is exerted to tend to rotate these clamps into close contact with the cylinder 11.

Although it is possible to use a hand feed for the electrode supplying the arc at the edges 12, I illustrate schematically an automatic feed system, whereby wire 16 from a reel 17 is unreeled by an automatic control system. The wire 16 is of course chosen of the right size and material to provide the proper welded joint. A small motor 18 is diagrammatically indicated as serving to rotate a friction pulley 19 engaging the electrode 16, which is engaged on the other side by a similar pulley 20. A movement longitudinally of the seam at 12 is imparted to the electrode by any desired form of apparatus, to deposit metal in the narrow space formed between the edges. The supply of welding current can be secured from any proper source, and I indicate a direct current generator 21 as this source. One terminal of this generator is connected to the electrode 16, as by the aid of roller 20, and the other terminal is shown as grounded. The arc formed near the edges 12 conducts the welding current to these edges and the inset 14, whence it is led to a ground connection 22, in a manner to be described.

The welding current, it is to be noted, must pass longitudinally through at least part of the bar 14, and also through at least part of the horn 13. Since this welding current is very large, a considerable magnetic field is set up in and around these parts carrying the current; and in fact it has been found that this field is sufficiently strong to influence the arc formed adjacent the edges at 12. This influence is to shift the arc away, and is at times great enough to cause its extinction. In actual practice extinction would occur due to this quite frequently. The condition is somewhat aggravated by the fact that large masses of magnetic material, such as the clamps 15, are placed comparatively close to the arc. Furthermore, there probably exists a strong field between the adjacent edges of the body 11, which also has a bad effect upon the arc.

In order to neutralize this field, I provide an arrangement which in this instance includes a conductor 23. This conductor is insulatingly supported substantially parallel and close to the horn 13. For instance it may be supported on an insulation bar 24 fastened to the bottom of horn 13 so that the conductor extends longitudinally through the cylinder being welded. The connections are such that the conductor 23 is in this instance in series with the horn 13, and this is accomplished by the aid of a short connection 26, between adjacent ends of the horn 13 and the bar 23. The other end of the bar 23 is connected to the ground connection 22. I have found that there is a variation in the magnetic effect caused by the current flowing through conductor 23, if the connections are changed from one end to the other; and it is accordingly desirable to try out both schemes to determine which direction of current flow is best for neutralizing the disturbing field. When installed in the proper way, the current flowing in the various parts of the welding circuit produce a resultant field which has substantially no effect upon the arc, the field set up by the arc being counterbalanced by the field set up by the current flow in conductor 23, which counterbalancing field may be set up in the work 11 or in the apparatus. The arc is therefore maintained in a steady condition, and it has no tendency to become extinguished.

I claim:

1. In an arc welding system, a conducting support on which the article to be welded may be placed, and forming a path for the arc current extending along a seam to be welded, a conductor adjacent and substantially parallel to said support, and means for connecting the support and conductor in series for carrying the arc current.

2. A system for welding seams between magnetic sheet metal comprising means for producing a welding arc along one side of said seam, said means incorporating said metal as one electrode, and means including a current carrying conductor arranged substantially parallel to the other side of said seam for stabilizing the operation of said arc.

3. A backing bar against which the work is adapted to be clamped during arc welding comprising a conductor extending along the length of the bar and in proximity to its work-engaging surface, and means for insulating the conductor from the bar.

In testimony whereof, I have hereunto set my hand.

ALBERT K. HARFORD.